US010935962B2

United States Patent
Cheng et al.

(10) Patent No.: US 10,935,962 B2
(45) Date of Patent: Mar. 2, 2021

(54) SYSTEM AND METHOD FOR IDENTIFYING ROOT CAUSES OF YIELD LOSS

(71) Applicant: NATIONAL CHENG KUNG UNIVERSITY, Tainan (TW)

(72) Inventors: Fan-Tien Cheng, Tainan (TW); Yao-Sheng Hsieh, Tainan (TW); Jing-Wen Zheng, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 628 days.

(21) Appl. No.: 15/260,343

(22) Filed: Sep. 9, 2016

(65) Prior Publication Data

US 2017/0153630 A1 Jun. 1, 2017

Related U.S. Application Data

(60) Provisional application No. 62/260,656, filed on Nov. 30, 2015.

(51) Int. Cl.
*G05B 19/418* (2006.01)
*G06F 16/2457* (2019.01)
(Continued)

(52) U.S. Cl.
CPC ... *G05B 19/4184* (2013.01); *G05B 19/41875* (2013.01); *G05B 19/41885* (2013.01); *G06F 7/20* (2013.01); *G06F 16/24578* (2019.01); *G05B 2219/45032* (2013.01); *Y02P 90/02* (2015.11)

(58) Field of Classification Search
None
See application file for complete search history.

(56) References Cited

U.S. PATENT DOCUMENTS 6,458,610 B1 * 10/2002 Lensing .......... G01N 21/95607
257/E21.525
6,470,230 B1 * 10/2002 Toprac ............... G03F 7/70625
257/E21.525
(Continued)

FOREIGN PATENT DOCUMENTS

CN 102110584 B * 9/2012
CN 103020349 B * 5/2015
(Continued)

OTHER PUBLICATIONS

Machine Translation for CN102110584B (Year: 2019).*
(Continued)

*Primary Examiner* — Catherine T. Rastovski
*Assistant Examiner* — Leonard S Liang
(74) *Attorney, Agent, or Firm* — CKC & Partners Co., LLC

(57) ABSTRACT

Embodiments of the present invention provide a two-phase process for searching the root causes of the yield loss in the production line 100. In a first phase, process tools and their process tool types that are likely to cause the yield loss are identified, and in a second phase, the process parameters that are likely to cause the yield loss within the process tool types found in the first phase are identified. In each phase, two different algorithms can be used to generate a reliance index $(RI_k)$ for gauge the reliance levels of their search results.

15 Claims, 6 Drawing Sheets

(51) Int. Cl.
G06F 7/20 (2006.01)
G05B 23/02 (2006.01)

(56) References Cited

U.S. PATENT DOCUMENTS

| | | | | |
|---|---|---|---|---|
| 6,821,792 | B1* | 11/2004 | Sonderman | H01L 22/20 156/345.15 |
| 6,957,120 | B1* | 10/2005 | Bode | G05B 23/0221 438/14 |
| 7,198,964 | B1* | 4/2007 | Cherry | G05B 19/41875 257/E21.521 |
| 7,209,846 | B2* | 4/2007 | Tamaki | G06Q 10/06 700/109 |
| 7,254,458 | B2* | 8/2007 | Hasan | G05B 15/02 700/109 |
| 7,346,878 | B1* | 3/2008 | Cohen | G06F 30/39 716/55 |
| 7,494,893 | B1* | 2/2009 | Inani | G05B 19/41875 438/424 |
| 8,095,484 | B2 | 1/2012 | Cheng et al. | |
| 8,849,615 | B2* | 9/2014 | Kost | G05B 23/024 702/185 |
| 9,142,014 | B2* | 9/2015 | Lin | G06T 7/001 |
| 9,829,415 | B2* | 11/2017 | Cheng | G01N 1/00 |
| 2003/0061212 | A1* | 3/2003 | Smith | G06Q 10/06 |
| 2003/0182252 | A1* | 9/2003 | Beinglass | H01L 22/20 706/45 |
| 2005/0033467 | A1* | 2/2005 | Purdy | H01L 22/20 700/109 |
| 2007/0002295 | A1* | 1/2007 | Reuhman-Huisken | G03F 7/70483 355/53 |
| 2007/0177135 | A1* | 8/2007 | Tuohy | G05B 23/0221 356/237.2 |
| 2007/0192751 | A1* | 8/2007 | Sinha | G06F 30/39 716/54 |
| 2008/0106278 | A1* | 5/2008 | Huo | G01R 31/2894 324/759.01 |
| 2008/0147579 | A1* | 6/2008 | Gao | G10L 15/197 706/25 |
| 2008/0275586 | A1* | 11/2008 | Ko | G05B 23/0221 700/110 |
| 2008/0294354 | A1* | 11/2008 | Zhu | G01M 7/08 702/39 |
| 2008/0306625 | A1* | 12/2008 | Cheng | G05B 19/41875 700/145 |
| 2009/0178013 | A1* | 7/2009 | Wang | G06F 30/30 716/132 |
| 2009/0292386 | A1* | 11/2009 | Cheng | G05B 19/41875 700/109 |
| 2009/0317924 | A1* | 12/2009 | Ouyang | H01L 21/67276 438/5 |
| 2010/0121474 | A1* | 5/2010 | Bomholt | G05B 19/41885 700/104 |
| 2010/0249976 | A1* | 9/2010 | Aharoni | G05B 23/0216 700/110 |
| 2010/0332475 | A1* | 12/2010 | Birdwell | G06F 16/283 707/737 |
| 2012/0049881 | A1* | 3/2012 | Johnson | G01R 31/2894 324/762.01 |
| 2013/0006406 | A1* | 1/2013 | Aharoni | G05B 23/0216 700/97 |
| 2013/0030760 | A1* | 1/2013 | Ho | G05B 19/41875 702/179 |
| 2013/0174102 | A1* | 7/2013 | Leu | G05B 19/41875 716/52 |
| 2014/0236515 | A1* | 8/2014 | Ho | G06Q 10/04 702/84 |
| 2014/0358465 | A1* | 12/2014 | Shin | G05B 19/41875 702/82 |
| 2017/0220706 | A1* | 8/2017 | Orbon | G06F 30/3323 |

FOREIGN PATENT DOCUMENTS

| | | | |
|---|---|---|---|
| JP | 2001160572 A | 6/2001 | |
| JP | 2006065598 A | 3/2006 | |
| KR | 20090121177 A | 11/2009 | |
| WO | WO-2006039625 A2 * | 4/2006 | G06F 30/30 |

OTHER PUBLICATIONS

Machine Translation for CN103020349B (Year: 2019).*
Wikipedia Entry for Lasso (statistics) (snapshot taken by Wayback Machine on Oct. 10, 2015) (Year: 2015).*
Ching-Kang Ing et al., "A Stepwise Regression Method and Consistent Model Selection for High-Dimensional Sparse Linear Models," Statistica Sinica, 2011, pp. 1473-1513.
Robert Tibshirani, "Regression Shrinkage and Selection via the Lasso," Journal of the Royal Statistical Society, Series B (Methodological), vol. 58, Issue 1, 1996, pp. 267-288.
Trevor Hastie et al., "The Elements of Statistical Learning: Data Mining, Inference, and Prediction," Second Edition, 2009, Springer-Verlag.
Argon Chen et al., "Sample-Efficient Regression Trees (SERT) for Semiconductor Yield Loss Analysis," IEEE Transactions on Semiconducotr Manufactruing, vol. 23, No. 3, Aug. 2010, pp. 358-369.
Dan Port et al., "Practicing What is Preached: 80-20 Rules for Strategic IV&V Assessment," IEEE, 2008, pp. 45-54.
Mangkholien Singson et al., "Implication of 80/20 Rule in Electronic Journal Usage of UGC-Infonet Consortia," The Journal of Academic Librarianship, vol. 41, Issue 2, 2015, pp. 207-219.

* cited by examiner

US 10,935,962 B2

SYSTEM AND METHOD FOR IDENTIFYING ROOT CAUSES OF YIELD LOSS

RELATED APPLICATIONS

This application claims priority to U.S. provisional Application Ser. No. 62/260,656, filed Nov. 30, 2015, which is herein incorporated by reference.

BACKGROUND

Field of Invention

The present invention relates to a system and a method for identifying root causes of a yield loss. More particularly, the present invention relates to a system and a method for identifying root causes of a yield loss with a reliance index for evaluating the reliability of the identified root causes.

Description of Related Art

Product yield directly affects production cost. Manufacturers all seek to quickly enhance the product yield during development and mass-production phases. In other words, when a yield loss occurs, its root causes should be found rapidly in both the development and mass-production phases. When the yield loss is encountered, a conventional yield enhancement approach is to collect all production-related data to perform a big data analysis in order to find out the root causes causing the yield loss and remedy them. However, the amount of production-related data is often enormous and complicated, and thus it is very difficult to search for the root causes of the yield loss from production-related data.

With the advancement of semiconductor and thin film transistor-liquid crystal display (TFT-LCD) manufacturing technologies, their manufacturing processes are becoming more and more sophisticated. As a result, how to maintain feasible production yield of these sophisticated manufacturing processes becomes an essential issue. A yield management system aims to enhance product yield. However, the number of workpieces is small at the research-and-development (RD) and ramp-up phases, which makes the yield management system hard to find out the root causes of defects among all production tools. Thus, how to find out the key process parameters of the defective process tools causing the yield loss among numerous production tools with limited workpiece samples is a widely concerned issue. This challenge is the so-called high-dimensional variable selection problem, which is also denoted as the issue of p>>n, in which "p" represents the number of explanatory process-related parameters of the process tools in the semiconductor or TFT-LCD process, and "n," on the other hand, is the sampling number of end products (processed workpieces) in the semiconductor or TFT-LCD process.

SUMMARY

An object of the present invention is to provide a method and a system for briefly identifying root causes of a yield loss in a production line.

Another object of the present invention is to provide a reliance index ($RI_k$) for gauge the reliance levels of the search results.

According to the aforementioned objects, a method for identifying root causes of a yield loss is provided. In the method, a production line is first provided and includes process stages, each of the process stages including process tools which belong to plural process tool types respectively, each of the process tools including at least one process device, each of the at least one process device having process parameters configured for processing one of workpieces. Then, the workpieces are processed according to production routes respectively, in which each of the production routes indicates a predetermined device of the process devices of the process tools in the process stages for processing one of the workpieces. Thereafter, metrology is performed on each of the workpieces after being processed by its corresponding predetermined device, thereby obtaining plural sets of in-line metrology values corresponding to the workpieces. Then, at least one yield test is performed on each of the workpieces after passing through the production line, thereby obtaining plural sets of final inspection values corresponding to the workpieces respectively. Thereafter, a step is performed to determine if a yield test failure is encountered according to the sets of final inspection values. A first phase is performed when the yield test failure is encountered. The first phase includes a first root-cause searching step. In the first root-cause searching step, a first searching model is prepared based on a first algorithm, in which the first algorithm is a triple phase orthogonal greedy algorithm (TPOGA), a least absolute shrinkage and selection operator (LASSO) algorithm or a sample-efficient regression trees (SERT). Then, at least one first key device that is likely to cause the yield test failure is identified from the process devices of the process tools at the process stages by feeding the sets of final inspection values of the workpieces as well as the sets of in-line metrology values of the workpieces and the production routes of the workpieces into the first searching model.

In some embodiments, In the first phase, a second searching model is further prepared based on a second algorithm that is different from the first algorithm, in which the second algorithm is the triple phase orthogonal greedy algorithm (TPOGA), the least absolute shrinkage and selection operator (LASSO) algorithm or the sample-efficient regression trees (SERT). Then, at least one second key device that is likely to cause the yield test failure is identified from the process devices of the process tools at the process stages by feeding the final inspection values of the workpieces as well as the sets of in-line metrology values of the workpieces and the production routes of the workpieces to the second searching model. Thereafter, the at least one first key device is ranked and scored, and the at least one second key device is ranked and scored. Then, similarities of rankings between the at least one first, key device and the at least one second key device are compared, thereby obtaining a first reliance index to gauge a reliance level of identified results of the at least one first key device and the at least one second key device.

In some embodiments, after the first phase, a second phase is performed, in which the second phase includes a second root-cause searching step. In the second root-cause searching step, one of the at least one first key device is selected, in which the one of the at least one first key device belongs to a key process tool type of the process tool types. Then, first key process parameters that are likely to cause the yield test failure are identified by inputting the final inspection values of the workpieces as well as values of all of the process parameters of the process devices of the process tools belonging to the key process tool type at all of the process stages into the first searching model.

According to the aforementioned objects, another method for identifying root causes of a yield loss occurring in a production line including process stages, each of the process stages including at least one process tool, each of the at least one process tool including at least one process device each of which belongs to one of at least one process tool type, each of the at least one process device having process parameters configured for processing one of workpieces. The method includes: obtaining production routes each of which indicates a predetermined device of the process devices of the process tools in the process stages for processing one of the workpieces; receiving plural sets of in-line metrology values of the workpieces, in which the sets of in-line metrology values are obtained by performing metrology on the workpieces after being processed by their predetermined devices; receiving plural sets of final inspection values corresponding to the workpieces, in which the sets of final inspection values are obtained by performing at least one yield test on each of the workpieces after passing through the production line; determining if a yield test failure is encountered according to the final inspection values; and performing a first phase when the yield test failure is encountered, in which the first phase includes a first root-cause searching step. The first root-cause searching step includes: preparing a first searching model based on a first algorithm, wherein the first algorithm is a triple phase orthogonal greedy algorithm (TPOGA), a least absolute shrinkage and selection operator (LASSO) algorithm or a sample-efficient regression trees (SERT); and identifying, from the process devices of the process tools at the process stages, at least one first key device that is likely to cause the yield test failure by feeding the sets of final inspection values of the workpieces as well as the sets of in-line metrology values of the workpieces and the production routes of the workpieces into the first searching model.

In some embodiments, after the first phase, a second phase is performed, in which the second phase includes a second root-cause searching step, the second root-cause searching step including: selecting one of the at least one first key device, in which the one of the at least one first key device belongs to a key process tool type of the process tool types; identifying plural first key process parameters that are likely to cause the yield test failure by inputting the final inspection values of the workpieces as well as values of all of the process parameters of the process devices of the process tools belonging to the key process tool type at all of the process stages into the first searching model.

According to the aforementioned objects, a system for identifying root causes of a yield loss occurring in a production line including process stages, each of the process stages including at least one process tool each of which belongs to one of at least one process tool type, each of the at least one process tool including at least one process device, each of the at least one process device having process parameters configured for processing one of workpieces. The system includes a memory and a processor. The memory stores production information and plural sets of final inspection values corresponding to the workpieces, the production information including production routes, values of the process parameters and plural sets of in-line metrology values of the workpieces, in which each of the production routes indicates a predetermined device of the process devices of the process tools in the process stages for processing one of the workpieces the sets of in-line metrology values are obtained by performing metrology on the workpieces promptly after being processed by their predetermined devices, and the sets of final inspection values are obtained by performing at least one yield test on each of the workpieces after passing through the production line. The processor is configured to determine if a yield test failure is encountered according to the final inspection values; and to perform a first phase when the yield test failure is encountered, in which the first phase includes a first root-cause searching step. The first root-cause searching step includes: preparing a first searching model based on a first algorithm, in which the first algorithm is a triple phase orthogonal greedy algorithm (TPOGA), a least absolute shrinkage and selection operator (LASSO) algorithm or a sample-efficient regression trees (SERT); and identifying, from the process devices of the process tools at the process stages, at least one first key device that is likely to cause the yield test failure by feeding the sets of final inspection values of the workpieces as well as the sets of in-line metrology values of the workpieces and the production routes of the workpieces into the first searching model.

In some embodiments, after the first phase, the processor is configured to perform a second phase, the second phase comprising a second root-cause searching step, the second root-cause searching step including: selecting one of the at least one first key device, wherein the one of the at least one first key device belongs to a key process tool type of the at least one process tool type; identifying a plurality of first key process parameters that are likely to cause the yield test failure by inputting the final inspection values of the workpieces as well as the values of all of the process parameters of the process devices of the process tools belonging to the key process tool type at all of the process stages into the first searching model.

In some embodiment, the second phase further includes: identifying a plurality of second key process parameters that are likely to cause the yield test failure by inputting the final inspection values of the workpieces as well as the values of all of the process parameters of the process devices of the process tools belonging to the key process tool type at all of the process stages into the second searching model; ranking and scoring the first key process parameters; ranking and scoring the second key process parameters; and comparing similarities of rankings between the first key process parameters and the second key process parameters, thereby obtaining a second reliance index to gauge a reliance level of identified results of the first key process parameters and the second key process parameters.

Thus, with the application of the embodiments of the present invention, the root causes of the yield loss in the production line can be briefly identified, and the reliance levels of the search results can be effectively gauged.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
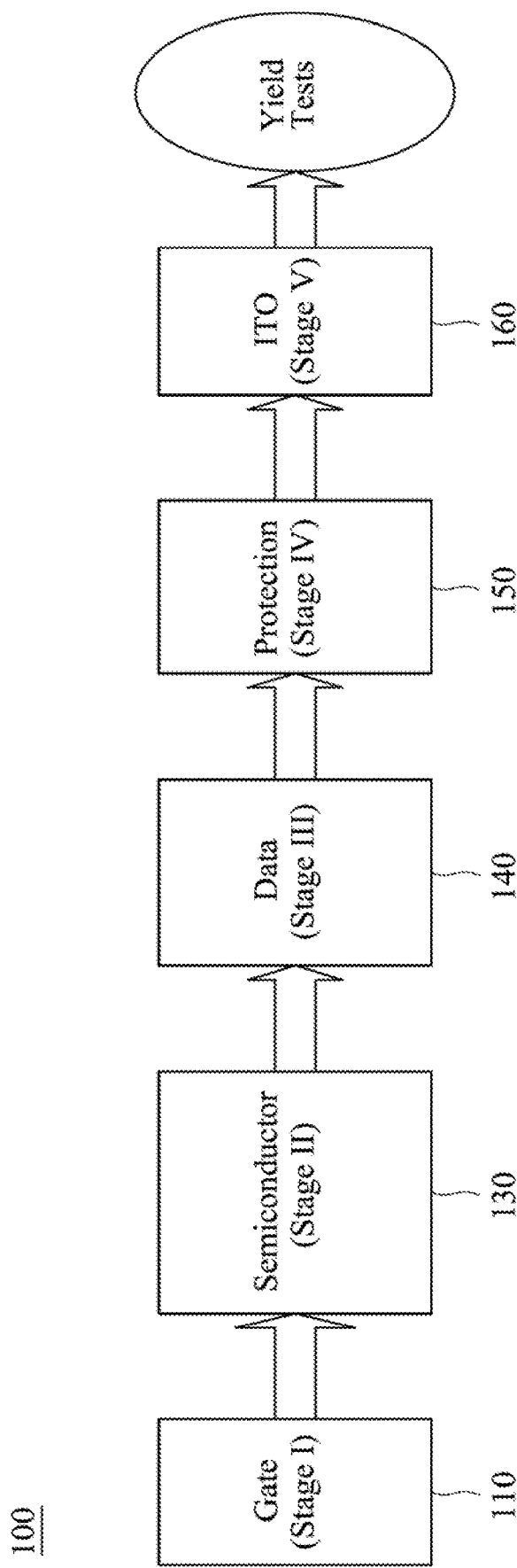
FIG. 1A is a schematic diagram showing a production line in accordance with some embodiments of the present invention.

Reference will now be made in detail to the present embodiments of the invention, examples of which are illustrated in the accompanying drawings. Wherever possible, the same reference numbers are used in the drawings and the description to refer to the same or like parts.

Figure 1B:
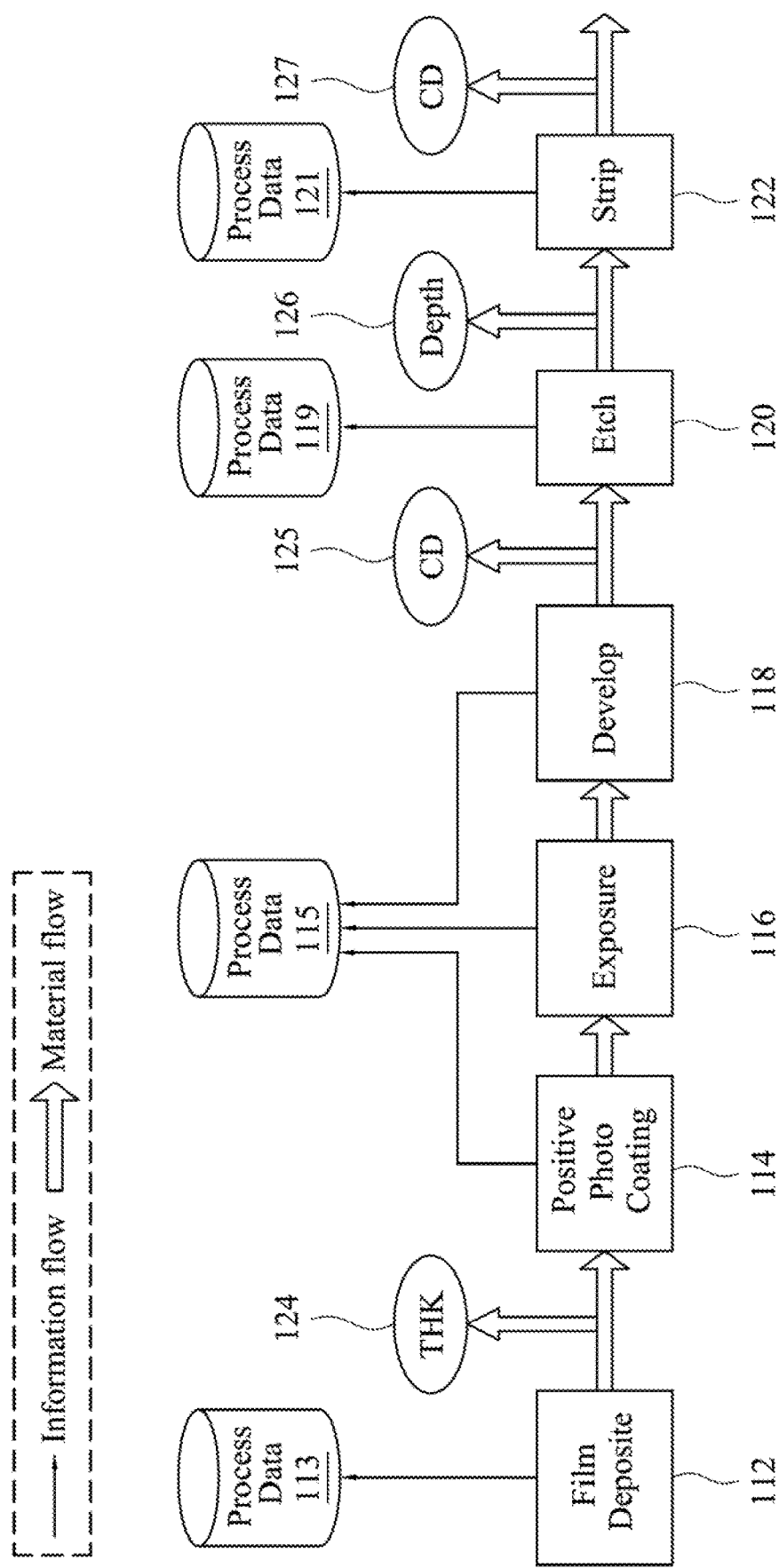
FIG. 1B is a schematic diagram showing exemplary process tool types in a process stage in accordance with some embodiments of the present invention.
Figure 1C:
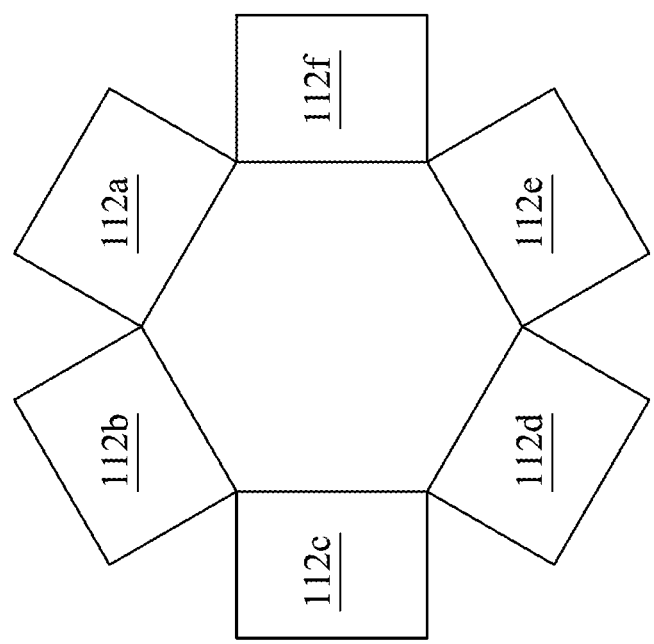
FIG. 1C is a schematic diagram showing an exemplary process tool in accordance with some embodiments of the present invention.

Referring to FIG. 1A to FIG. 1C, FIG. 1A is a schematic diagram showing a production line 100 in accordance with some embodiments of the present invention, in which a TFT process is illustrated as an example; FIG. 1B is a schematic diagram showing exemplary process tool types in a process stage in accordance with some embodiments of the present invention, in which a gate layer is illustrated as an example; and FIG. 1C is a schematic diagram showing an exemplary process tool in accordance with some embodiments of the present invention, in which a deposition tool is illustrated as an example.

Embodiments of the present invention are directed to identifying root causes of a yield loss occurring in the production line 100 including process stages 110, 130, 140, 150 and 160, in which each of the process stages 110, 130, 140, 150 and 160 includes process tools (not shown) which belong to process tool types 112, 114, 116, 118, 120 and 122 respectively. For example, as shown in FIG. 1B, each of the process stage 110, 130, 140, 150 and 160 includes process tools of process tool types 112, 114, 116, 118, 120 and 122. Each of the process tools includes at least one process device. For example, the process tool includes process devices 112a, 112b, 112c, 112d, 112e and 112f.

For example in a TFT-LCD plant, the production line 100 may be built for performing a TFT process, and the process stages 110 (stage I), 130 (stage II), 140 (stage III), 150 (stage IV) and 160 (stage V) may be gate, semiconductor, data, protection, and indium tin oxide (ITO) layers. The gate layer (process stage 110) includes process tools for the so-called photo engraving processes (PEP), the process tools belonging to respective process tool types such as film deposition (the process tool type 112), positive photoresist coating (the process tool type 114), exposure (the process tool type 116), developing (the process tool type 118), etching (the process tool type 120), and stripping (the process tool type 122). Each of the process tools includes process devices (chambers) 112a, 112b, 112c, 112d, 112e and 112f.

In operation, each of workpieces pass through the process stages 110, 130, 140, 150 and 160 one after one, and finally receives final tests, thereby obtaining plural sets of final inspection values corresponding to the workpieces respectively. Then, the final inspection values are used to determine if a yield test failure is encountered. Yield tests may encounter Type 1-Type 10 yield losses that are resulted from various defects caused by electric-test failures, particles, etc. At each of the process stages 110, 130, 140, 150 and 160, each workpiece is processed by the process tools of the respective process tool types 112, 114, 116, 118, 120 and 122 one after one, and each workpiece is only processed in one process device of each of the process tools. After being processed by a predetermined process device of the process tool of the process tool type 112, 114, 116, 118, 120 or 122, metrology is performed on each workpiece, thereby obtaining plural sets of in-line metrology values corresponding to the workpieces, in which the metrology may be actual measurements by metrology tools or virtual metrology, such as in-line metrology values 124 (thickness), 125 (critical dimension), 126 (depth) and 127 (critical dimension) shown in FIG. 1B. While each workpiece is processed in a process device, values of process parameters are collected by for example sensors, such as process data 113, 115, 119 and 121 shown in FIG. 1B.

Figure 2:
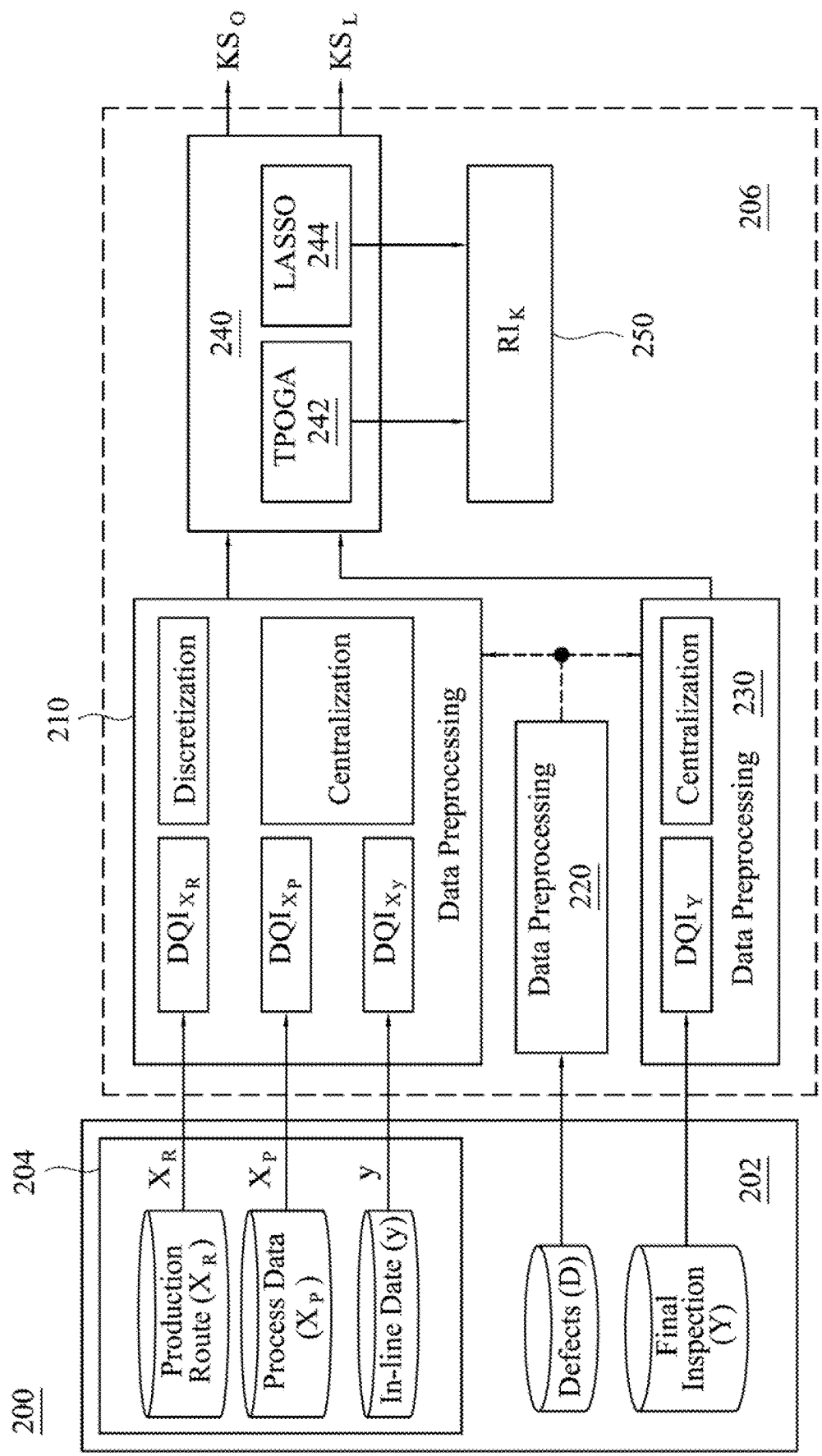
FIG. 2 is a schematic diagram showing a system for identifying root causes of a yield loss in accordance with some embodiments of the present invention.

Referring to FIG. 2, FIG. 2 is a schematic diagram showing a system 200 for identifying root causes of a yield loss in accordance with some embodiments of the present invention. The system 200 includes a memory 202 and a processor 206. The processor 206 may include any type of processor, microprocessor, or processing logic that may interpret and execute instructions (e.g., a field programmable gate array (FPGA)). The processor 206 may include a single device (e.g., a single core) and/or a group of devices (e.g., multi-core). The memory 202 may include a random access memory (RAM) or another type of dynamic storage device that may store information and instructions for execution by the processor 206. The memory 202 may also be used to store temporary variables or other intermediate information during execution of instructions by the processor 200. A database may be used to store the production information 204, the defects (D) and the sets of final inspection values (Y) which will be loaded to the memory 202 later for execution by the processor 206.

The memory 202 stores production information 204, defects (D) and plural sets of final inspection values (Y) corresponding to the workpieces after being processed in the production line 100 (FIG. 1A). The production information includes production routes ($X_R$) of the workpieces, values of the process parameters ($X_P$) and plural sets of in-line metrology values (y) of the workpieces, in which each of the production routes indicates a predetermined device of the process devices of the process tools in the process stages for processing one of the workpieces, such as "the process device 112a of the process tool of the process tool type 112 at the process stage 110" as shown in FIG. 1A to FIG. 1C. The sets of in-line metrology values (y) are obtained by performing metrology on the workpieces promptly after being processed by their predetermined devices, and the sets of final inspection values are obtained by performing at least one yield test on each of the workpieces after passing through the production line. Defects (D) could happen in any production stage, thus they are also imported for analysis. Then, the processed D may join the production information 204 or the final inspection values (Y) depending on the nature of D. The outputs of a root-cause searching step 240 are the search result of Triple Phase Orthogonal Greedy Algorithm (TPOGA) 242: $KS_O$ and that of Least Absolute Shrinkage and Selection Operator (LASSO) 244: $KS_L$, and their accompanying reliance index: $RI_K$. In some embodiments, a sample-efficient regression trees (SERT) may be used to replace the TPOGA 242 or LASSO 244. It is noted that the root-cause searching step 240 uses two different algorithms, such as TPOGA/LASSO, TPOGA/SERT, or LASSO/SERT. Hereinafter, TPOGA, LASSO and SERT are described.

The greedy algorithm is a stepwise regression method that considers the correlation between all the causing parameters (X) and the final inspection results (Y). In embodiments of the present invention, X includes all the related variables of production: $X_R$, $X_P$, and y; while Y represents the final inspection results (values). Pure greedy algorithm (PGA) and orthogonal greedy algorithm (OGA) can be used herein for solving the high-dimensional regression problem. However, OGA performs better than PGA in high-dimensional linear regression. In embodiments of the present invention, the processes of OGA, High-Dimensional Information Criterion (HDIC), and Trimming are combined to form the so-called TPOGA. Details of TPOGA used in embodiments of the present invention can be referenced to "A stepwise regression method and consistent model selection for high-dimensional sparse linear models" by C.-K. Ing and T. L. Lai, Statistica Sinica, vol. 21, pp. 1473-1513, 2011, which is hereby incorporated by reference, in which Ing and Lai discloses a termination condition, High-Dimensional Information Criterion (HDIC) to choose along the OGA path that has the smallest value of a suitably chosen criterion.

Unlike stepwise regression, LASSO is a shrinkage method which minimizes the residual sum of squares subject to the sum of the absolute value of the coefficients being less than a constant. Because of the nature of this constraint, it tends to produce some coefficients that are exactly zero and hence gives interpretable models. The significant difference between LASSO and the usual stepwise regression is that all the independent variables can be processed at the same time via LASSO but not the usual stepwise regression. Details of LASSO used in embodiments of the present invention can be referenced to "Regression shrinkage and selection via the LASSO" by R. Tibshirani, J. Royal Statistical Soc. B, vol. 58, no. 1, pp. 267-288, 1996, and "The elements of statistical learning: data mining, inference, and prediction" by Trevor Hastie, Robert Tibshirani and Jerome Friedman, Springer, N.Y., 2009, which are hereby incorporated by reference.

Figure 3:
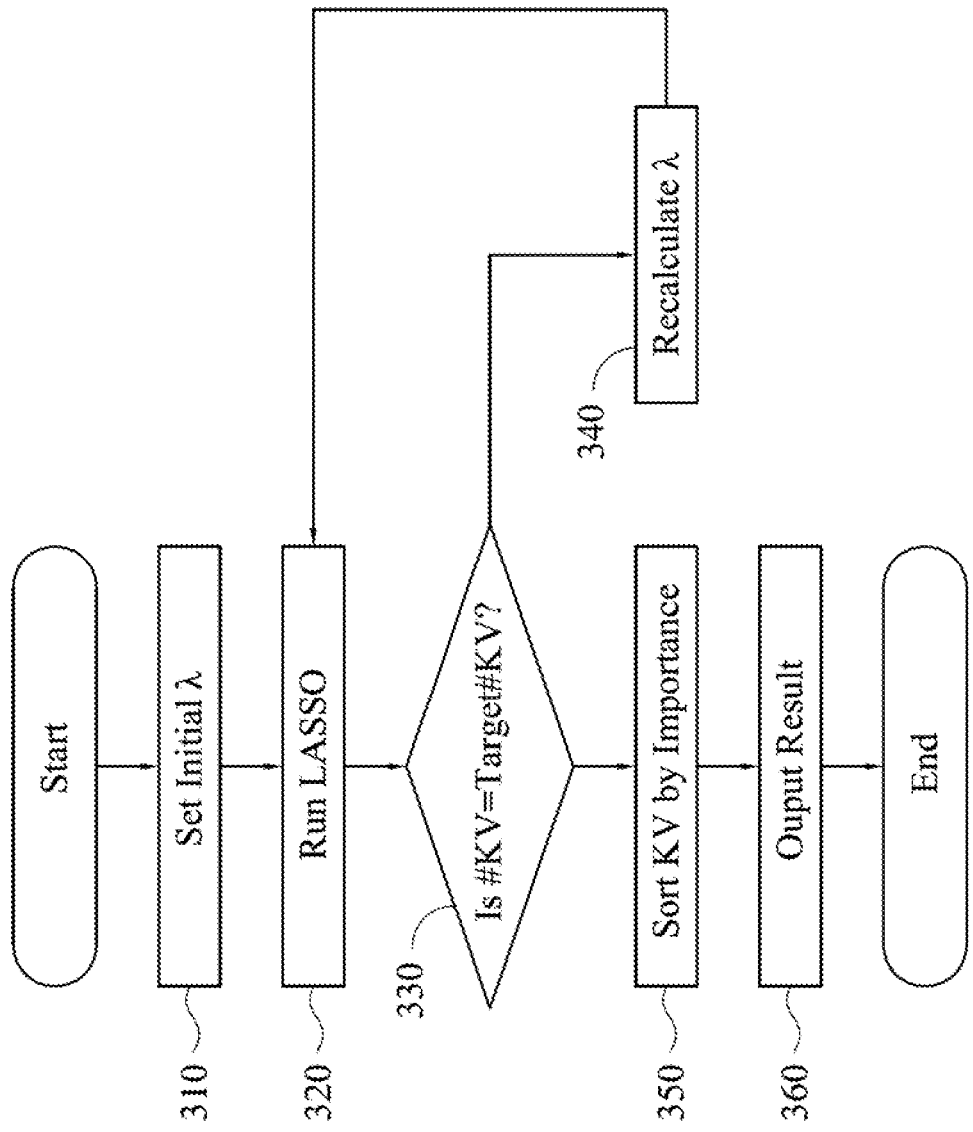
FIG. 3 is a schematic flow chart showing an automated penalty (λ) adjusting method in accordance with some embodiments of the present invention.
Figure 4:
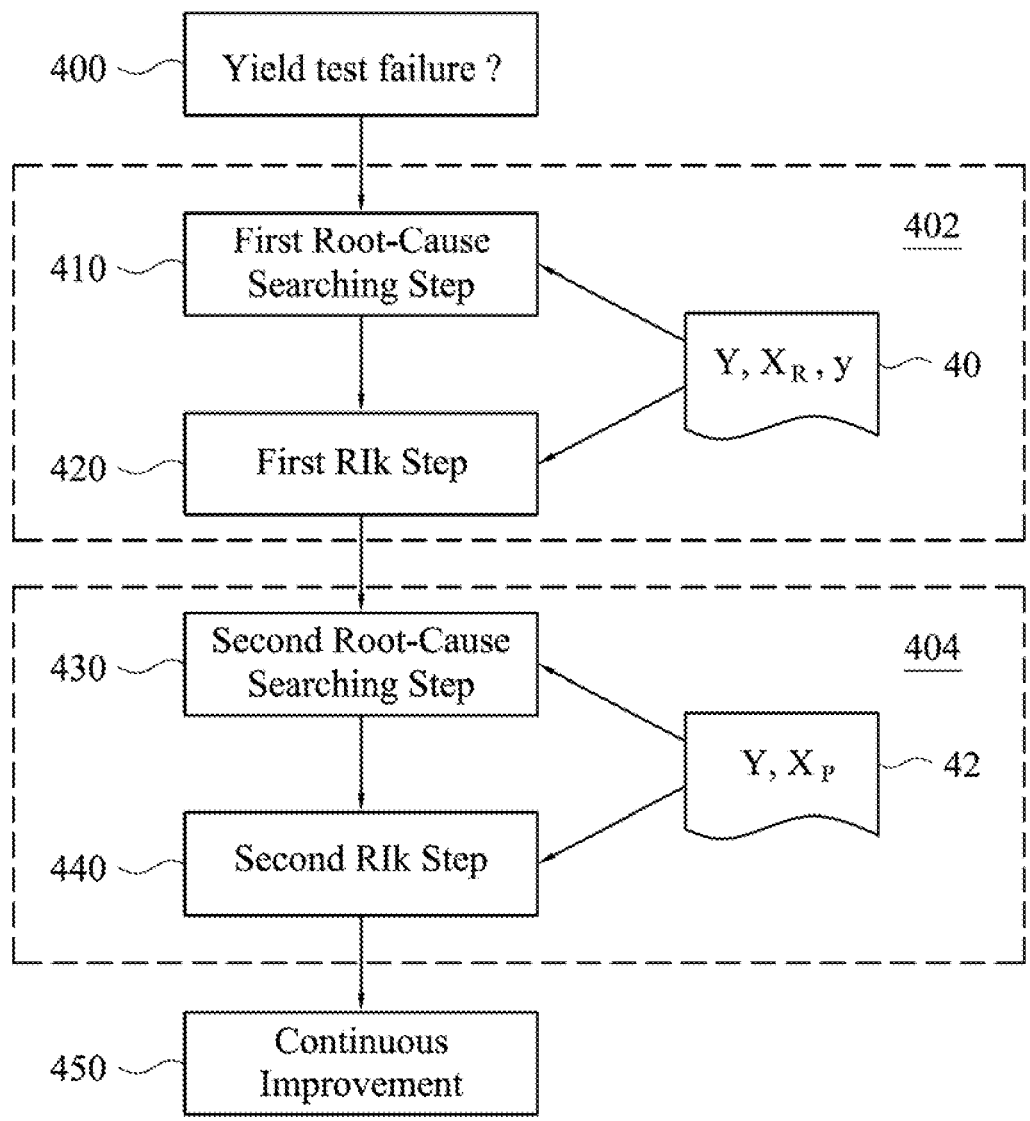
FIG. 4 is a schematic flow chart showing a method for identifying root causes of a yield loss in accordance with some embodiments of the present invention.

To reduce the puzzle of setting penalty ($\lambda$) and obtain proper results, in the embodiments of the present invention, the LASSO algorithm includes an automated penalty ($\lambda$) adjusting method, is referred to as an Automated LASSO (ALASSO). Referred to FIG. 3, FIG. 3 is a schematic flow chart showing the automated penalty ($\lambda$) adjusting method in accordance with some embodiments of the present invention. As shown in FIG. 3, at step 310, an initial value of the penalty ($\lambda$) is set be 5 or any appropriate value. At step 320, the LASSO is executed. At step 330, a proper target number of key variables (Target #KV, such as 10) is selected, and then it is checked if the number of key variables (#KV) selected by LASSO is equal to Target #KV. In embodiments of the present invention, key variables are the process stages or process parameters causing the yield loss. When the result of step 330 is no, step 340 is performed to recalculate the penalty ($\lambda$). The Target #KV is used to avoid picking up too many unnecessary variables. At step 340, with Lowerbound being defined as the lower bound of $\lambda$. The initial value of Lowerbound is 0 (because $\lambda \geq 0$). If #KV<Target #KV, $\lambda_{new}$=($\lambda_{old}$+Lowerbound)/2. On the other hand, if #KV>Target #KV, $\lambda_{new}$=$\lambda_{old}$+($\lambda_{old}$+Lowerbound)/2 and re-assign Lowerbound=$\lambda_{old}$. Thereafter, return to step 320.

When the result of step 330 is yes, step 350 is performed. At step 350, the key variables (KV) are sorted by importance in a descending order. Then, step 360 is performed to output the sorted KV as the result.

SERT combines the methodologies of forward selection in regression analysis and regression tree. Compared to the conventional decision trees such as CART (classification and regression trees), SERT is able to handle combination effect in the so-called high-dimensional (p>>n) problem. Details of SERT used in embodiments of the present invention can be referenced to "Sample-efficient regression trees (SERT) for semiconductor yield Loss Analysis" by A. Chen and A. Hong, IEEE Transactions on Semiconductor Manufacturing, vol. 23, no. 3, August 2010, which is hereby incorporated by reference.

As shown in FIG. 2, before performing the root-cause searching step 240, data preprocessing steps 210, 220 and 230 are required to be conducted to assure the data quality of all the inputs: production information ($X_R$, $X_P$, and y), defects (D), and final inspections (Y). The characteristics of these inputs are described below. $X_R$ needs to be discretized into 1 or 0, which indicates that the workpiece getting through this stage or not. $X_P$ contains data of tool process parameters (such as voltage, pressure, temperature, etc.) which need to be centralized. y stands for inline inspection data (such as critical dimension, thickness, etc.) which need to be centralized. As for D, different companies have different definitions of defects, and thus discussion with domain experts is required before executing data-preprocessing and quality check. Y stands for the yield test results (final inspection values) that should be centralized.

The data quality evaluation algorithm of $X_R$, denoted as a process data quality index ($DQIx_R$), evaluates the following four facts: 1) while a process stage may contain several process tools of the same type, the process stage utilizes only one of the process tools; if a production line should get through three process tools of the same process tool type, then the production line has three stages at which the three process tools are located respectively; 2) if a process tool is used in different production lines, the same device in a different production line would be considered as a different process stage; 3) there are only two possibilities for a workpiece passing through the process tool: get through ("1") or not ("0"); 4) a workpiece cannot get through any process tool that does not belong to that process stage.

Similarly, the data quality evaluation algorithms of $X_P$ and y are denoted as $DQIx_P$, and $DQIx_{Py}$ respectively. The data quality evaluation algorithm of Y is denoted as DQIy. Both $DQIx_P$, and DQIx, adopt the algorithms similar to the process data quality evaluation scheme utilized in U.S. Pat. No. 8,095,484 B2, and DQIy also applies the algorithm similar to the metrology data quality evaluation scheme used in U.S. Pat. No. 8,095,484 B2. U.S. Pat. No. 8,095,484 B2 is hereby incorporated by reference.

The processor 206 is configured to determine if a yield test failure is encountered according to the final inspection values; and to perform the root-cause searching step 240 when the yield test failure is encountered. In some embodiments, the root-cause searching step 240 is performed twice with two different algorithms such as TPOGA 242 and LASSO 244 respectively, thereby performing a step 250 for calculating a reliance index ($RI_K$) by comparing similarities of rankings between the results based on the TPOGA 242 and those based on the LASSO 244. The reliance index ($RI_K$) is used to gauge a reliance level of identified results based on the TPOGA 242 and the LASSO 244. By comparing the results of the TPOGA 242 and the LASSO 244 and taking overlapping and weights into considerations, $RI_K$ is re-calculated and set between 0~1. With $RI_{KT}$=0.7 being the threshold, if $RI_K$ is greater than $RI_{KT}$, good search results are obtained; otherwise, the search results need to be re-examined. The step 250 for calculating a reliance index ($RI_K$) will be described later.

Embodiments of the present invention provide a two-phase process for searching the root causes of the yield loss in the production line 100. In a first phase, process tools and their process stages that are likely to cause the yield loss are identified, and in a second phase, the process parameters that are likely to cause the yield loss within the process stage found in the first phase are identified. In each phase, two different algorithms can be used to generate a reliance index ($RI_k$) for gauge the reliance levels of the search results of the present invention.

Referring to FIG. 1A, FIG. 1B, FIG. 1C and FIG. 4, FIG. 4 is a schematic flow chart showing a method for identifying root causes of a yield loss in accordance with some embodiments of the present invention. At first, step 400 is performed to determine if a yield test failure is encountered according to the sets of final inspection values (Y). When the yield test failure is encountered, a first phase 402 is performed. In the first phase 402, a first root-cause searching step 410 is performed for identifying which process tool is most likely to cause the yield test failure (yield loss). In the first root-cause searching step 410, a first searching model based on a first algorithm is first prepared, in which the first algorithm is a triple phase orthogonal greedy algorithm (TPOGA), a least absolute shrinkage and selection operator (LASSO) algorithm or a sample-efficient regression trees (SERT), for example the TPOGA 242 shown in FIG. 2. Then, a set of first data 40 is fed into the first searching model, so as to identify at least one first key device (for example, the process device 112a of the process tool belonging to the process tool type 112 at the process stage 110) that is likely to cause the yield test failure from the process devices 112a-112f of the process tools at the process stages 110, 130, 140, 150 and 160. The set of first data 40 is composed of the final inspection values (Y) of the workpieces as well as the sets of in-line metrology values (y) of the workpieces and the production routes ($X_R$) of the workpieces. An example of results $KS_O$ of the first searching model (TPOGA) is shown in Table 1, in which top 10 process tools (first key devices) that are likely to cause the yield loss are found by TPOGA.

TABLE 1

| Pick Order | First Key Devices from TPOGA |
|---|---|
| 1 | Stage4:CVD:Eq 7 Ch B (process stage 150:tool type 112:device 112b) |
| 2 | Stage2:CVD:Eq A Ch A (process stage 130:tool type 112:device 112a) |
| 3 | Stage4:CVD:Eq 7 Ch C (process stage 150:tool type 112:device 112c) |
| 4 | Stage4:CVD:Eq 7 Ch D (process stage 150:tool type 112:device 112d) |
| 5 | Stage2:CVD:Eq A Ch B (process stage 130:tool type 112:device 112b) |
| 6 | Stage4:CVD:Eq 7 Ch E (process stage 150:tool type 112:device 112e) |
| 7 | Stage2:CVD:Eq A Ch C (process stage 130:tool type 112:device 112c) |
| 8 | Stage1:CVD:Eq 1 Ch A (process stage 120:tool type 112:device 112a) |
| 9 | Stage4:CVD:Eq 7 Ch A (process stage 150:tool type 112:device 112a) |
| 10 | Stage2:CVD:Eq A Ch D (process stage 130:tool type 112:device 112d) |

The possibilities of the devices causing the yield loss are deceasing from pick order 1 to pick order 10. As shown in Table 1, the process device 112a of the process tool 112 at the process stage 150 is at pick order 1, and is the most likely device causing the yield loss. After the first root-cause searching step 410 is completed, a first reliance index ($RI_K$) step 420 may be optionally performed to gauge the reliance level of the results of the first root-cause searching step 410 based on the first algorithm (for example, TPOGA).

In the first reliance index ($RI_K$) step 420, a second searching model based on a second algorithm is first prepared. The second algorithm is different from the first algorithm used in step 410, in which the second algorithm is the triple phase orthogonal greedy algorithm (TPOGA), the least absolute shrinkage and selection operator (LASSO) algorithm or the sample-efficient regression trees (SERT). For example, the first algorithm is the TPOGA 242 shown in FIG. 2, and the second algorithm is the LASSO 244 shown in FIG. 2, in which the LASSO 244 is the LASSO algorithm includes an automated penalty (λ) adjusting method, i.e. ALASSO. Then, the set of first data 40 is fed into the second searching model, so as to identify at least one second key device (for example, the process device 112a of the process tool belonging to the process tool type 112 at the process stage 110) that is likely to cause the yield test failure from the process devices 112a-112f of the process tools 112, 114, 116, 118 and 120 at the process stages 110, 130, 140, 150 and 160.

An example of results $KS_L$ of the second searching model is shown in Table 2, in which top 10 process tools (Devices) that are likely to cause the yield loss are found by ALASSO.

TABLE 2

| Pick Order | Second Key Devices from ALASSO |
|---|---|
| 1 | Stage4:CVD:Eq 7 Ch B (process stage 150:tool type 112:device 112b) |
| 2 | Stage2:CVD:Eq A Ch A (process stage 130:tool type 112:device 112a) |
| 3 | Stage4:CVD:Eq 7 Ch C (process stage 150:tool type 112:device 112c) |
| 4 | Stage1:PVD:Eq 1 Ch D (process stage 110:tool type 112:device 112d) |
| 5 | Stage1:PVD:Eq 1 Ch E (process stage 110:tool type 112:device 112e) |
| 6 | Stage2:CVD:Eq A Ch B (process stage 130:tool type 112:device 112b) |
| 7 | Stage4:CVD:Eq 7 Ch A (process stage 150:tool type 112:device 112a) |
| 8 | Stage4:CVD:Eq 7 Ch E (process stage 150:tool type 112:device 112e) |
| 9 | Stage2:CVD:Eq A Ch E (process stage 130:tool type 112:device 112e) |
| 10 | Stage2:CVD:Eq A Ch D (process stage 130:tool type 112:device 112d) |

Thereafter, the first key device listed in Table 1 and the second key device listed in Table 2 are ranked and scored. Since the sequential order of key devices searched by TPOGA and ALASSO is important as the key devices chosen earlier matters more, weights are assigned not only according to the sequential order but also the 80-20 principle to ensure higher score goes to the crucial minority. As a result, the final scores become $$FS_I = \begin{cases} \dfrac{OS_I}{\sum_{I=1}^{3} OS_I} \times 0.8, & \text{when pick order is 1, 2, 3.} \\ \dfrac{OS_I}{\sum_{I=4}^{10} OS_I} \times 0.2, & \text{when pick order is 4, 5, \ldots, 10.} \end{cases} \quad (1)$$

where $OS_I$ is the original score and $FS_I$ is the final score with I=1, 2, . . . , 10 being the pick order.

Embodiments the present invention are not limited to the aforementioned 80-20 principle, and other scoring methods are also applicable to the embodiments of the present invention. After the calculation of equation 1, an example of final scores of the first key devices and the second devices are shown in Table 3 and Table 4.

TABLE 3

| Pick Order (I) | First Key Devices from TPOGA | Final Score ($FS_{O_i}$) |
|---|---|---|
| 1 | Stage4:CVD:Eq 7 Ch B | 0.8 * (1.0/2.7) = 0.296 |
| 2 | Stage2:CVD:Eq A Ch A | 0.8 * (0.9/2.7) = 0.267 |
| 3 | Stage4:CVD:Eq 7 Ch C | 0.8 * (0.8/2.7) = 0.237 |
| 4 | Stage4:CVD:Eq 7 Ch D | 0.2 * (0.7/2.8) = 0.050 |
| 5 | Stage2:CVD:Eq A Ch B | 0.2 * (0.6/2.8) = 0.043 |
| 6 | Stage4:CVD:Eq 7 Ch E | 0.2 * (0.5/2.8) = 0.036 |
| 7 | Stage2:CVD:Eq A Ch C | 0.2 * (0.4/2.8) = 0.029 |
| 8 | Stage1:CVD:Eq 1 Ch A | 0.2 * (0.3/2.8) = 0.021 |
| 9 | Stage4:CVD:Eq 7 Ch A | 0.2 * (0.2/2.8) = 0.014 |
| 10 | Stage2:CVD:Eq A Ch D | 0.2 * (0.1/2.8) = 0.007 |

TABLE 4

| Pick Order (I) | Second Key Devices from ALASSO | Final Score ($FS_{L_j}$) |
|---|---|---|
| 1 | Stage4:CVD:Eq 7 Ch B | 0.8 * (1.0/2.7) = 0.296 |
| 2 | Stage2:CVD:Eq A Ch A | 0.8 * (0.9/2.7) = 0.267 |
| 3 | Stage4:CVD:Eq 7 Ch C | 0.8 * (0.8/2.7) = 0.237 |
| 4 | Stage1:PVD:Eq 1 Ch D | 0.2 * (0.7/2.8) = 0.050 |
| 5 | Stage1:PVD:Eq 1 Ch E | 0.2 * (0.6/2.8) = 0.043 |
| 6 | Stage2:CVD:Eq A Ch B | 0.2 * (0.5/2.8) = 0.036 |
| 7 | Stage4:CVD:Eq 7 Ch A | 0.2 * (0.4/2.8) = 0.029 |
| 8 | Stage4:CVD:Eq 7 Ch E | 0.2 * (0.3/2.8) = 0.021 |
| 9 | Stage2:CVD:Eq A Ch E | 0.2 * (0.2/2.8) = 0.014 |
| 10 | Stage2:CVD:Eq A Ch D | 0.2 * (0.1/2.8) = 0.007 |

Then, similarities of rankings (pick orders) between the first key devices and the second key devices are compared, thereby obtaining a first reliance index ($RI_k$) to gauge a reliance level of identified results of the first key devices and the second key devices. The rule of thumb of calculating $RI_K$ is explained below. If a certain key device has been chosen by both TPOGA and ALASSO with the same sequential pick order, the score of this key device is counted. Then, if a certain key device has been chosen by both TPOGA and ALASSO with different sequential pick orders, the score of this key device is also counted. Finally, if TPOGA and ALASSO pick out different key devices without overlapping, the score of this variable is not counted. Therefore, $RI_K$ of the search results is calculated by $$RI_K = \sum_{i=1}^{10} \sum_{j=1}^{10} \left( \frac{FS_{O_i} + FS_{L_j}}{2} \right) \text{ if } O_i = L_j \quad (2)$$

where $FS_{O_i}$ final score of $O_i$ $FS_{L_j}$ final score of $L_j$ $O_i$ $i^{th}$ pick process device of TPOGA, $i = 1, 2, 3, \ldots, 10$ $L_j$ $j^{th}$ pick process device of ALASSO, $j = 1, 2, 3, \ldots, 10$ As such, $RI_K$ is calculated by equation (2). The result of $RI_K$ based on Tables 3 and 4 is 0.932 that is greater than a threshold $RI_{KT}$ (for example, 0.7). The $RI_K$ threshold may vary in accordance with actual requirements. This implies that the search results of TPOGA and ALASSO are almost the same, and thus the results are reliable.

As shown in Tables 3 and 4, the Top 1 device is Chamber B of Equipment 7 of Film Deposition process in Protection layer (stage); while Top 2 device is Chamber A of Equipment A of Film Deposition process in Semiconductor layer (stage). Compared with the plant test data, among 28 workpieces, 3 out of 8 Type 2 Loss samples were processed by the Top 1 device and another 3 out of 8 Type 2 Loss samples were processed by the Top 2 device. Thus, the results of the first root-cause searching step 410 match the plant test data.

After step 410 or step 420, a second phase 404 is performed. In the second phase, a second root-cause searching step 430 is performed to find out which process parameters are likely to cause the yield loss. At step 420, at first, one process device of the first or second key devices is selected, in which the one process device belongs to a key process tool type of the process tool types. Then, a set of second data 42 is fed into the first searching model, so as to identify first key process parameters that are likely to cause the yield test failure, in which the set of second data 42 is composed of the final inspection values (Y) of the workpieces as well as values of all of the process parameters ($X_P$) of the process devices of the process tools belonging to the key process tool type at all of the process stages. For example, the Top 2 device (Stage2:CVD:Eq A Ch A) is selected for illustration. The process data of the Top 2 device has 27 process parameters ($X_P$). After performing the analysis using the first searching model on all the process devices at the same process stage to which the Top 2 device belongs, the first key process parameters "Control Voltage", "Current", and "DC voltage" are found to be the root causes of the yield loss.

After the second root-cause searching step 430, a second reliance index ($RI_k$) step 440 may be optionally performed to gauge the reliance level of the results of the second root-cause searching step 430. In the second reliance index ($RI_k$) step 440, the set of second data 42 is fed into the second searching model, so as to identify second key process parameters that are likely to cause the yield test failure. After performing the analysis using the second searching model on all the process devices at the same process stage to which the Top 2 device belongs, the second key process parameters "Control Voltage", "Current", and "Flow Rate" are found to be the root causes of the yield loss. Thereafter, similar to the above description, the first key process parameters are ranked and scored, and the second key process parameters are ranked and scored. Thereafter, similarities of rankings between the first key process parameters and the second key process parameters are compared, thereby obtaining a second reliance index ($RI_k$) to gauge a reliance level of identified results of the first key process parameters and the second key process parameters. For example, the second reliance index ($RI_K$) of key process parameters search is 0.864 (>0.7). Therefore, the search result is reliable with the Top 1 variable being "Control Voltage". Thereafter, at step 450, a notice is issued to the relevant departments for fixing the problem and for continuous improvement.

It is understood that the method for identifying root causes of a yield loss is performed by the aforementioned steps. A computer program of the present invention stored on a non-transitory tangible computer readable recording medium is used to perform the method described above. The aforementioned embodiments can be provided as a computer program product, which may include a machine-readable medium on which instructions are stored for programming a computer (or other electronic devices) to perform a process based on the embodiments of the present invention. The machine-readable medium can be, but is not limited to, a floppy diskette, an optical disk, a compact disk-read-only memory (CD-ROM), a magneto-optical disk, a read-only memory (ROM), a random access memory (RAM), an erasable programmable read-only memory (EPROM), an electrically erasable programmable read-only memory (EEPROM), a magnetic or optical card, a flash memory, or another type of media/machine-readable medium suitable for storing electronic instructions. Moreover, the embodiments of the present invention also can be downloaded as a computer program product, which may be transferred from a remote computer to a requesting computer by using data signals via a communication link (such as a network connection or the like).

It is also noted that the present invention also can be described in the context of a manufacturing system. Although the present invention may be implemented in semiconductor fabrication, the present invention is not limited to implementation in semiconductor fabrication and may be applied to other manufacturing industries, in which the manufacturing system is configured to fabricate workpieces or products including, but not limited to, microprocessors, memory devices, digital signal processors, application specific integrated circuits (ASICs), or other similar devices. The present invention may also be applied to workpieces or manufactured products other than semiconductor devices, such as vehicle wheels, screws. The manufacturing system includes one or more processing tools that may be used to form one more products, or portions thereof, in or on the workpieces (such as wafers). Persons of ordinary skill in the art should appreciate that the processing tools may be implemented in any number of entities of any type, including lithography tools, deposition tools, etching tools, polishing tools, annealing tools, machine tools, and the like. In the embodiments, the manufacturing system also includes one or more metrology tools, such as scatterometers, ellipsometers, scanning electron microscopes, and the like.

It can be known from the aforementioned embodiments that, by using the two-phase process for searching the root causes of the yield loss in the production line, the root cases can be briefly identified from an enormous amount of possible causes. In each phase, a reliance index ($RI_k$) can be used for gauge the reliance levels of the search results.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for identifying root causes of a yield loss, the method comprising:
   providing a production line comprising a plurality of process stages, each of the process stages comprising a plurality of process tools which belong to a plurality of process tool types respectively, each of the process tools comprising at least one process device, each of the at least one process device having a plurality of process parameters configured for processing one of a plurality of workpieces;
   processing the workpieces respectively by using the process devices of the process tools in the process stages according to a plurality of production routes respectively, each of the production routes indicating a predetermined device of the at least one process device of each of at least one of the process tools in each of the process stages for processing one of the workpieces, the production routes indicating that, when one of the process stages contains several process tools of the same process tool type, the one of the process stages utilizes only one of the process tools of the same process tool types; and when the production line gets through three process tools of the same process tool type, then the production line has three stages at which the three process tools are located respectively;
   performing metrology on each of the workpieces by using metrology tools or virtual metrology after the each of the workpieces is processed by its corresponding predetermined device, thereby obtaining a plurality of sets of in-line metrology values corresponding to the workpieces;
   performing at least one yield test on each of the workpieces after the each of the workpieces passes through the production line, thereby obtaining a plurality of sets of final inspection values corresponding to the workpieces respectively;
   based on the sets of final inspection values corresponding to the workpieces, detecting if a yield test failure including a plurality of types of yield loss is encountered;
   performing a first phase when the yield test failure is encountered, the first phase comprising a first root-cause searching step, the first root-cause searching step comprising:
      preparing a first searching model based on a first algorithm, wherein the first algorithm is a triple phase orthogonal greedy algorithm (TPOGA), a least absolute shrinkage and selection operator (LASSO) algorithm or a sample-efficient regression trees (SERT); and
      identifying, from the process devices of the process tools at the process stages, at least one first key device that is likely to cause the yield test failure by feeding the sets of final inspection values of the workpieces as well as the sets of in-line metrology values of the workpieces and the production routes of the workpieces into the first searching model;
   after the first phase, performing a second phase, the second phase comprising a second root-cause searching step, the second root-cause searching step comprising:
      selecting one of the at least one first key device, wherein the one of the at least one first key device belongs to a key process tool type of the process tool types; and
      identifying a plurality of first key process parameters that are likely to cause the yield test failure by inputting the final inspection values of the workpieces as well as values of all of the process parameters of the process devices of the process tools belonging to the key process tool type at all of the process stages into the first searching model; and
   based on information identified from the first and second phases, issuing a notice to relevant departments, in order to perform improvement related to yield of the production line.

2. The method of claim 1, wherein the first phase further comprises:
   preparing a second searching model based on a second algorithm that is different from the first algorithm, wherein the second algorithm is the triple phase orthogonal greedy algorithm (TPOGA), the least absolute shrinkage and selection operator (LASSO) algorithm or the sample-efficient regression trees (SERT);

identifying from the process devices of the process tools at the process stages, at least one second key device that is likely to cause the yield test failure by feeding the final inspection values of the workpieces as well as the sets of in-line metrology values of the workpieces and the production routes of the workpieces to the second searching model;

ranking and scoring the at least one first key device;

ranking and scoring the at least one second key device; and comparing similarities of rankings between the at least one first key device and the at least one second key device, thereby obtaining a first reliance index to gauge a reliance level of identified results of the at least one first key device and the at least one second key device.

3. The method of claim 1, wherein the second phase further comprises:

preparing a second searching model based on a second algorithm that is different from the first algorithm, wherein the second algorithm is the triple phase orthogonal greedy algorithm (TPOGA), the least absolute shrinkage and selection operator (LASSO) algorithm or the sample-efficient regression trees (SERT);

identifying a plurality of second key process parameters that are likely to cause the yield test failure by inputting the final inspection values of the workpieces as well as values of all of the process parameters of the process devices of the process tools belonging to the key process tool type at all of the process stages into the second searching model;

ranking and scoring the first key process parameters;

ranking and scoring the second key process parameters; and comparing similarities of rankings between the first key process parameters and the second key process parameters, thereby obtaining a second reliance index to gauge a reliance level of identified results of the first key process parameters and the second key process parameters.

4. The method of claim 1, wherein performing metrology on each of the workpieces comprises performing virtual metrology on each of the workpieces.

5. The method of claim 1, wherein the LASSO algorithm comprises an automated penalty adjusting method.

6. A method for identifying root causes of a yield loss occurring in a production line comprising a plurality of process stages, each of the process stages comprising at least one process tool each of which belongs to one of at least one process tool type, each of the at least one process tool comprising at least one process device, each of the at least one one process device having a plurality of process parameters configured for processing one of a plurality of workpieces, the method comprising:

obtaining a plurality of production routes each of which indicates a predetermined device of the at least one process device of each of at least one of the process tools in the process stages for processing one of the workpieces, the production routes indicating that, when one of the process stages contains several process tools of the same process tool type, the one of the process stages utilizes only one of the process tools of the same process tool types; and when the production line gets through three process tools of the same process tool type, then the production line has three stages at which the three process tools are located respectively;

receiving a plurality of sets of in-line metrology values of the workpieces, wherein the sets of in-line metrology values are obtained by performing metrology on each of the workpieces by using metrology tools or virtual metrology after the each of the workpieces is processed by its predetermined device;

receiving a plurality of sets of final inspection values corresponding to the workpieces, wherein the sets of final inspection values are obtained by performing at least one yield test on each of the workpieces after passing through the production line;

based on the sets of final inspection values corresponding to the workpieces, detecting if a yield test failure including a plurality of types of yield loss is encountered; and performing a first phase when the yield test failure is encountered, the first phase comprising a first root-cause searching step, the first root-cause searching step comprising:

preparing a first searching model based on a first algorithm, wherein the first algorithm is a triple phase orthogonal greedy algorithm (TPOGA), a least absolute shrinkage and selection operator (LASSO) algorithm or a sample-efficient regression trees (SERT); and identifying, from the process devices of the process tools at the process stages, at least one first key devices that is likely to cause the yield test failure by feeding the sets of final inspection values of the workpieces as well as the sets of in-line metrology values of the workpieces and the production routes of the workpieces into the first searching model;

after the first phase, performing a second phase, the second phase comprising a second root-cause searching step, the second root-cause searching step comprising:

selecting one of the at least one first key device, wherein the one of the at least one first key device belongs to a key process tool type of the process tool types; and identifying a plurality of first key process parameters that are likely to cause the yield test failure by inputting the final inspection values of the workpieces as well as values of all of the process parameters of the process devices of the process tools belonging to the key process tool type at all of the process stages into the first searching model; and based on information identified from the first and second phases, issuing a notice to relevant departments, in order to perform improvement related to yield of the production line.

7. The method of claim 6, wherein the first phase further comprises:

preparing a second searching model based on a second algorithm that is different from the first algorithm, wherein the second algorithm is the triple phase orthogonal greedy algorithm (TPOGA), the least absolute shrinkage and selection operator (LASSO) algorithm or the sample-efficient regression trees (SERT);

identifying from the process devices of the process tools at the process stages, at least one second key device that is likely to cause the yield test failure by feeding the final inspection values of the workpieces as well as the sets of in-line metrology values of the workpieces and the production routes of the workpieces to the second searching model;

ranking and scoring the at least one first key device;

ranking and scoring the at least one second key device; and comparing similarities of rankings between the at least one first key device and the at least one second key device, thereby obtaining a first reliance index to gauge a reliance level of identified results of the at least one first key device and the at least one second key device.

8. The method of claim 6, wherein the second phase further comprises:
preparing a second searching model based on a second algorithm that is different from the first algorithm, wherein the second algorithm is the triple phase orthogonal greedy algorithm (TPOGA), the least absolute shrinkage and selection operator (LASSO) algorithm or the sample-efficient regression trees (SERT);
identifying a plurality of second key process parameters that are likely to cause the yield test failure by inputting the final inspection values of the workpieces as well as values of all of the process parameters of the process devices of the process tools belonging to the key process tool type at all of the process stages into the second searching model;
ranking and scoring the first key process parameters;
ranking and scoring the second key process parameters; and
comparing similarities of rankings between the first key process parameters and the second key process parameters, thereby obtaining a second reliance index to gauge a reliance level of identified results of the first key process parameters and the second key process parameters.

9. The method of claim 6, wherein the sets of in-line metrology values are obtained by performing virtual metrology on the workpieces after being processed by their predetermined devices.

10. The method of claim 6, wherein the LASSO algorithm comprises an automated penalty adjusting method.

11. A system for identifying root causes of a yield loss occurring in a production line comprising a plurality of process stages, each of the process stages comprising at least one process tool each of which belongs to one of at least one process tool type, each of the at least one process tool comprising at least one process device, each of the at least one process device having a plurality of process parameters configured for processing one of a plurality of workpieces, the system comprising:
a memory storing production information and a plurality of sets of final inspection values corresponding to the workpieces, the production information including a plurality of production routes, values of the process parameters and a plurality of sets of in-line metrology values of the workpieces, wherein each of the production routes indicates a predetermined device of the at least one process device of each of at least one of the process tools in the process stages for processing one of the workpieces, the sets of in-line metrology values are obtained by performing metrology on each of the workpieces by using metrology tools or virtual metrology after the each of the workpieces is processed by its predetermined device, and the sets of final inspection values are obtained by performing at least one yield test on each of the workpieces after passing through the production line, the production routes indicating that, when one of the process stages contains several process tools of the same process tool type, the one of the process stages utilizes only one of the process tools of the same process tool types; and when the production line gets through three process tools of the same process tool type, then the production line has three stages at which the three process tools are located respectively;
a processor configured to:
based on the sets of final inspection values corresponding to the workpieces, detecting if a yield test failure including a plurality of types of yield loss is encountered; and
perform a first phase when the yield test failure is encountered, the first phase comprising a first root-cause searching step, the first root-cause searching step comprising:
preparing a first searching model based on a first algorithm, wherein the first algorithm is a triple phase orthogonal greedy algorithm (TPOGA), a least absolute shrinkage and selection operator (LASSO) algorithm or a sample-efficient regression trees (SERT); and
identifying, from the process devices of the process tools at the process stages, at least one first key devices that is likely to cause the yield test failure by feeding the sets of final inspection values of the workpieces as well as the sets of in-line metrology values of the workpieces and the production routes of the workpieces into the first searching model;
perform a second phase after the first phase, the second phase comprising a second root-cause searching step, the second root-cause searching step comprising:
selecting one of the at least one first key device, wherein the one of the at least one first key device belongs to a key process tool type of the at least one process tool type; and
identifying a plurality of first key process parameters that are likely to cause the yield test failure by inputting the final inspection values of the workpieces as well as the values of all of the process parameters of the process devices of the process tools belonging to the key process tool type at all of the process stages into the first searching model; and
based on information identified from the first and second phases, issue a notice to relevant departments, in order to perform improvement related to yield of the production line.

12. The system of claim 11, wherein the first phase further comprises:
preparing a second searching model based on a second algorithm that is different from the first algorithm, wherein the second algorithm is the triple phase orthogonal greedy algorithm (TPOGA), the least absolute shrinkage and selection operator (LASSO) algorithm or the sample-efficient regression trees (SERT);
identifying from the process devices of the process tools at the process stages, at least one second key device that is likely to cause the yield test failure by feeding the final inspection values of the workpieces as well as the sets of in-line metrology values of the workpieces and the production routes of the workpieces to the second searching model;
ranking and scoring the at least one first key device;
ranking and scoring the at least one second key device; and
comparing similarities of rankings between the at least one first key device and the at least one second key device, thereby obtaining a first reliance index to gauge a reliance level of identified results of the at least one first key device and the at least one second key device.

13. The system of claim 11, wherein the second phase further comprises:

preparing a second searching model based on a second algorithm that is different from the first algorithm, wherein the second algorithm is the triple phase orthogonal greedy algorithm (TPOGA), the least absolute shrinkage and selection operator (LASSO) algorithm or the sample-efficient regression trees (SERT);

identifying a plurality of second key process parameters that are likely to cause the yield test failure by inputting the final inspection values of the workpieces as well as the values of all of the process parameters of the process devices of the process tools belonging to the key process tool type at all of the process stages into the second searching model;

ranking and scoring the first key process parameters;

ranking and scoring the second key process parameters; and comparing similarities of rankings between the first key process parameters and the second key process parameters, thereby obtaining a second reliance index to gauge a reliance level of identified results of the first key process parameters and the second key process parameters.

14. The system of claim 11, wherein the sets of in-line metrology values are obtained by performing virtual metrology on the workpieces after being processed by their predetermined devices.

15. The system of claim 11, wherein the LASSO algorithm comprises an automated penalty adjusting method.

* * * * *